United States Patent
Sang et al.

(10) Patent No.: US 9,439,031 B2
(45) Date of Patent: Sep. 6, 2016

(54) CELLULAR-TO-GNSS FINE TIME ASSISTANCE AND POWER AMPLIFIER (PA) BLANKING

(71) Applicant: Broadcom Corporation, Irvine, CA (US)

(72) Inventors: Aimin Justin Sang, San Diego, CA (US); Kamesh Medapalli, San Jose, CA (US)

(73) Assignee: Broadcom Corporation, Irvine, CA (US)

(*) Notice: Subject to any disclaimer, the term of this patent is extended or adjusted under 35 U.S.C. 154(b) by 233 days.

(21) Appl. No.: 13/916,210

(22) Filed: Jun. 12, 2013

(65) Prior Publication Data
US 2014/0369389 A1    Dec. 18, 2014

(51) Int. Cl.
*H04W 4/02* (2009.01)
*G01S 19/05* (2010.01)
*G01S 19/21* (2010.01)
*H04W 56/00* (2009.01)

(52) U.S. Cl.
CPC .......... *H04W 4/02* (2013.01); *G01S 19/05* (2013.01); *G01S 19/21* (2013.01); *H04W 56/00* (2013.01)

(58) Field of Classification Search
CPC ... H04W 4/02; H04W 56/001; H04W 4/021; H04W 56/0035; H04W 76/023
USPC .............. 455/456.1, 456.3, 456.6, 404.2; 342/357.2, 357.39, 357.73, 450; 375/144
See application file for complete search history.

(56) References Cited

U.S. PATENT DOCUMENTS

| | | | |
|---|---|---|---|
| 8,780,880 B2* | 7/2014 | Lin | H04W 72/1215 370/345 |
| 9,179,428 B2* | 11/2015 | Medapalli | H04W 4/021 |
| 9,185,516 B2* | 11/2015 | Fischer | G01S 19/05 |
| 2002/0183070 A1* | 12/2002 | Bloebaum et al. | 455/456 |
| 2008/0224924 A1* | 9/2008 | Lethbridge | G01S 19/05 342/357.29 |
| 2011/0158114 A1* | 6/2011 | Novak et al. | 370/252 |
| 2012/0069766 A1* | 3/2012 | Fu et al. | 370/252 |
| 2012/0176923 A1* | 7/2012 | Hsu | H04W 52/243 370/252 |
| 2012/0229334 A1* | 9/2012 | Waters et al. | 342/357.42 |
| 2013/0035099 A1* | 2/2013 | Boejer et al. | 455/436 |
| 2013/0063308 A1* | 3/2013 | Krasner | G01S 19/05 342/393 |
| 2013/0235864 A1* | 9/2013 | Do et al. | 370/350 |
| 2013/0279423 A1* | 10/2013 | Ahn | H04W 24/02 370/328 |
| 2013/0310068 A1* | 11/2013 | Fischer et al. | 455/456.1 |

(Continued)

*Primary Examiner* — Cong Tran
(74) *Attorney, Agent, or Firm* — Sterne, Kessler, Goldstein & Fox P.L.L.C.

(57) ABSTRACT

Systems and methods for providing Fine Time Assistance (FTA) and Power Amplifier (PA) Blanking to a Global Navigation Satellite System (GNSS) module are provided. In an embodiment, FTA is provided in a communications device having a GNSS module and a cellular communications module, where the cellular communications module is configured to receive a reference time, transmit a pulse to the GNSS module at a pulse generation time, and provide a compensated reference time based on the pulse generation time to the GNSS module. In another embodiment, PA blanking is provided in a communications device having a GNSS module and a cellular communications module, where the cellular communications module is configured to transmit a pulse to the GNSS module to signal a high cellular-to-GNSS interference time period.

21 Claims, 5 Drawing Sheets

(56) References Cited

U.S. PATENT DOCUMENTS

| | | | |
|---|---|---|---|
| 2013/0324049 A1* | 12/2013 | Mujtaba | H04B 15/00 455/63.1 |
| 2013/0324154 A1* | 12/2013 | Raghupathy et al. | 455/456.1 |
| 2013/0328724 A1* | 12/2013 | Mayor et al. | 342/450 |
| 2014/0036882 A1* | 2/2014 | Baghel | H04B 1/1027 370/336 |
| 2015/0005029 A1* | 1/2015 | Medapalli | H04W 4/021 455/552.1 |

* cited by examiner

CELLULAR-TO-GNSS FINE TIME ASSISTANCE AND POWER AMPLIFIER (PA) BLANKING

FIELD OF THE INVENTION

The present disclosure relates generally to cellular to Global Navigation Satellite System (GNSS) assistance.

BACKGROUND

Background Art

Cellular-based and Global Navigation Satellite System (GNSS)-based applications are widespread in today's personal communication devices. Cellular-based applications rely on having a cellular communications modem within the communications device and the availability of a cellular network. GNSS-based applications rely on the availability of a GNSS receiver within the communications device.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

For purposes of this discussion, the term "module" shall be understood to include at least one of software, firmware, and hardware (such as one or more circuits, microchips, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

In the following disclosure, terms defined by the Long-Term Evolution (LTE) standard are sometimes used. For example, the term "eNodeB" is used to refer to what is commonly described as a base station (BS) or a base transceiver station (BTS) in other standards. The term "User Equipment (UE)" is used to refer to what is commonly described as a mobile station (MS) or mobile terminal in other standards. However, as will be apparent to a person of skill in the art based on the teachings herein, embodiments are not limited to the LTE standard and can be applied to other cellular communication standards (e.g., Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), Worldwide Interoperability for Microwave Access (WiMAX), etc.). Further, embodiments are not limited to cellular communication networks and can be used or implemented in other kinds of wireless communication access networks (e.g., wireless local area network (WLAN), Bluetooth (BT), etc.).

Figure 1:
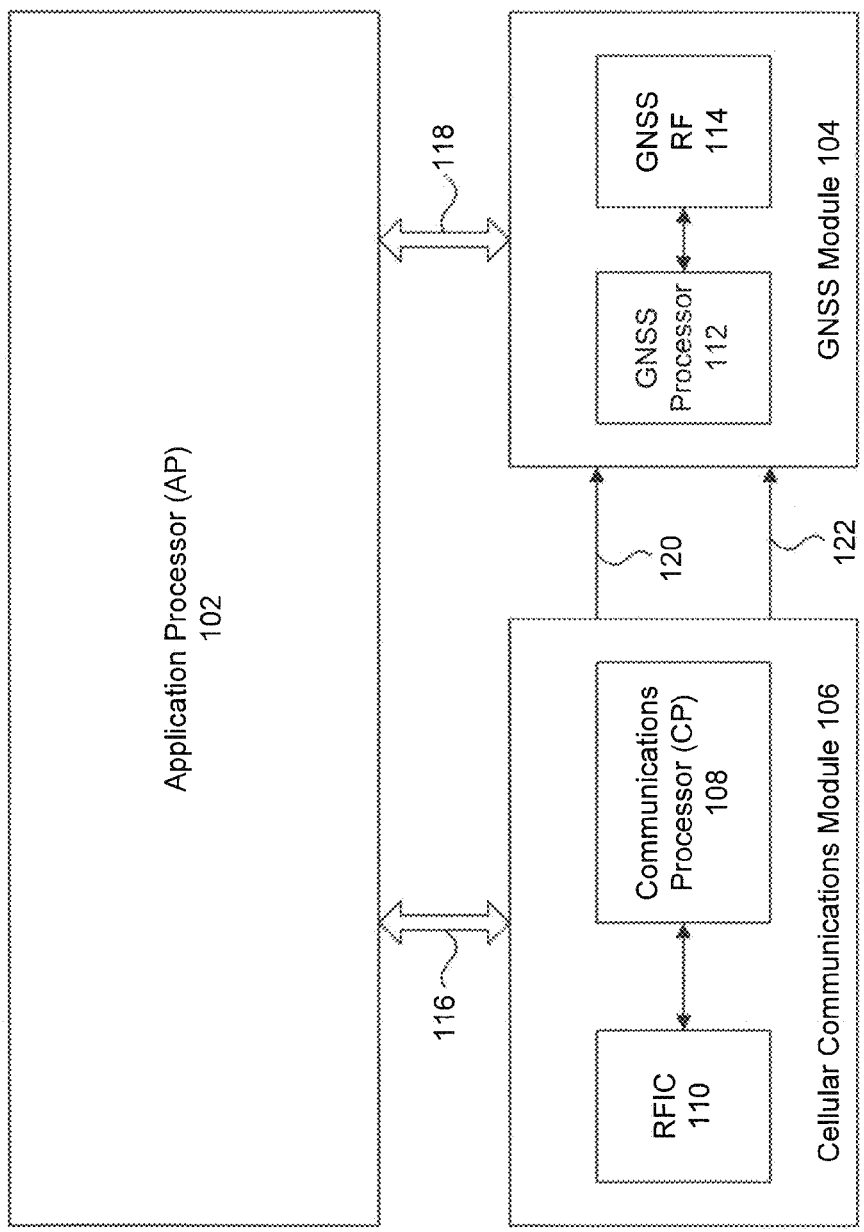
FIG. 1 illustrates an example communications device according to an embodiment.

FIG. 1 illustrates an example communications device 100 according to an embodiment. Example communications device 100 is provided for the purpose of illustration and is not limiting of embodiments of the present disclosure. Communications device 100 may be a smart phone, tablet, or personal computer (PC), for example, which enables data communication (e.g., Internet access, email, smart phone applications, etc.) as well as voice calling. Communications device 100 may support various cellular communication technologies including, without limitation, LTE, HSPA+, W-CDMA, CDMA2000, TD-SCDMA, GSM, GPRS, EDGE, and WiMAX, for example.

As shown in FIG. 1, communications device 100 includes an application processor (AP) 102, a Global Navigation Satellite System (GNSS) module 104, and a cellular communications module 106.

AP 102 can enable various Internet Protocol (IP)-based applications, including data, audio (e.g., voice, streaming music, etc.), and/or video applications. To support these applications, AP 102 can implement various protocol stacks, including an "IP" stack, which includes the Transmission Control Protocol (TCP) and/or the User Datagram Protocol (UDP) over the Internet Protocol (IP). Further, AP 102 can enable various navigation applications and/or location-based services (LBS) applications. These navigation and/or location-based services (LBS) applications can be enabled by GNSS, cellular communication, and/or WLAN technologies, for example.

AP 102 can communicate with other modules of communications device 100. For example, as shown in FIG. 1, AP 102 can communicate with cellular communications module 106 via an interface 116 and with GNSS module 104 via an interface 118. Interfaces 115 and 118 can each be implemented as a Secure Digital Input/Output (SDIO) interface, a High-Speed-Inter-Chip (HSIC) interface, or a Universal Asynchronous Receiver/Transmitter (UART) interface, for example. In an embodiment, interface 118 includes a UART interface, and interface 116 includes a HSIC interface. In an embodiment, AP 102 includes respective interface drivers (not shown in FIG. 1) to drive interfaces 116 and 118.

In an embodiment, AP 102 can use cellular communications module 106 as a data link layer or Layer 2 (L2) pipe that provides L2 functions for IP-based traffic sent and received by AP 102. For example, L2 functions provided by cellular communications module 106 may include, without limitation, data link layer functions, Medium Access Control (MAC) layer functions, and Radio Link Control (RLC) functions. In addition, AP 102 can use cellular communications module 106 for baseband processing functions, including, without limitation, channel encoding/decoding, line coding/decoding, modulation/demodulation, etc. In an embodiment, the functions provided by cellular communications module 106 are particular to cellular communication technologies supported by cellular communications module 106.

Cellular communications module 106 includes one or more cellular communications modems, which can support a variety of cellular communications technologies, including, without limitation, LTE, HSPA+, W-CDMA, CDMA2000, TD-SCDMA, GSM, GPRS, EDGE, and WiMAX, for example. Cellular communications module 106 enables communications device 100 to communicate with a cellular network, and more particularly with a base station of the cellular network. As shown in FIG. 1, cellular communications module 106 includes, without limitation, a communications processor (CP) 108 and a radio frequency integrated circuit (RFIC) module 110. As would be understood by a person of skill in the art, CP 108 can comprise one or more processors in implementation and is shown as a single module in FIG. 1 for simplification.

CP 108 can include one or more processors or processing engines (e.g., Digital Signal Processing (DSP) engines), including, for example, a general controller processor/processing engine, a L2 protocol stack processor/processing engine, a baseband processor/processing engine, and a speech coding processor/processing engine.

The general controller processor includes a chip-level general controller of cellular communications module 106, which can perform general housekeeping functions, including boot up, configuration, and management functions within cellular communications module 106. The speech coding processor/processing engine implements various speech coding, including, for example, narrow-band, wide-band, and adaptive multi-rate speech coding functions, data compression functions, and/or acoustical processing functions, including noise suppression, echo cancellation, etc.

The L2 protocol stack processor/processing engine implements one or more L2 protocol stacks, including, for example, data link layer protocols, MAC layer protocols, and RLC protocols. L2 protocols are defined by cellular communications technologies and may be common to more than one technology. In an embodiment, as described above, the L2 protocol stack processor/processing engine provides an L2 data pipe for AP 102 via interface 116. The L2 protocol stack processor/processing engine may implement a variety of L2 protocol stacks in accordance with various cellular communications standards, including, for example and without limitation, LTE, HSPA+, W-CDMA, CDMA2000, TD-SCDMA, GSM, GPRS, EDGE, and WiMAX.

The baseband processor/processing engine implements baseband processing functions, including, without limitation, channel encoding/decoding, line coding/decoding, modulation/demodulation, etc. For example, the baseband processor/processing engine may implement a variety of baseband processing functions in accordance with various cellular communications standards, including, for example and without limitation, LTE, HSPA+, W-CDMA, CDMA2000, TD-SCDMA, GSM, GPRS, EDGE, and WiMAX.

In an embodiment, the baseband processor/processing engine communicates with RFIC module 110 to transmit or receive signals over the air interface to or from a base station of the cellular network. RFIC module 110 includes various mixed signal (e.g., Digital-to-Analog Converters (DACs), Analog-to-Digital Converters (ADCs)) and analog components (filters, mixers, power amplifier (PA), low noise amplifier (LNA), etc.) that provide at least one RE transmit chain and at least one RF receive chain.

GNSS module 104 includes one or more GNSS receivers, including, for example, a Global Position System (UPS) receiver, a GLONASS receiver, a Galileo receiver, and or a Beidou receiver. As shown in FIG. 1, in an embodiment, a GNSS receiver can include a GNSS radio frequency (RF) unit 114 for receiving satellite signals and a GNSS processor 112 for sampling the received satellite signals and using the samples to search for, acquire, and track satellites. GNSS processor 112 or another processor (located either in GNSS module 104 or AP 102) can provide higher-level navigation solutions (e.g., position/velocity calculation). As would be understood by a person of skill in the art, the GNSS receiver can be implemented using a different architecture than shown in FIG. 1, in other embodiments.

In an embodiment, cellular communications module 106 is configured to provide GNSS module 104 with a Fine Time Assistance (FTA) pulse 120 and/or a Power Amplifier (PA) blanking pulse 122. In an embodiment, FTA pulse 120 and PA blanking pulse 122 are provided using General Purpose Input/Output (GPIO) pins of cellular communications module 106.

FTA pulse 120 serves to signal to GNSS module 104 a time instant that corresponds to a reference time (value) forwarded, after delay compensation, to GNSS module 104. In an embodiment, the reference time is forwarded to GNSS module 104 via AP 102 and is delay compensated by cellular communications module 106 and/or AP 102. In an embodiment, the pulse generation time of FTA pulse 120 is hardware controlled and is sufficiently narrow to within a desired timing accuracy of GNSS module 104. In an embodiment, the pulse generation time of FTA pulse 120 can be controlled up to a 1 microsecond granularity.

In an embodiment, the reference time is received by cellular communications module 106 from a serving base station of the cellular network. The reference time can be received in a message, such as an LTE Location Position Protocol (LPP) message, received by the cellular communications module 106 in response to a location request sent by cellular communications module 106 to a location server of the cellular network. In an embodiment, the location request can be initiated by a Location Service (LCS) client (not shown in FIG. 1) miming on AP 102.

In an embodiment, the reference time received from the cellular network by cellular communications module 106 includes a GNSS reference time information element (IE), which includes two sub-IEs: a GNSS system time IE and a GNSS Reference Time for Cells IE. The GNSS system time IE includes an absolute GNSS system time (hereinafter denoted as T0) received by the cellular network from GNSS satellites. The GNSS Reference Time for Cells IE includes an array of GNSS Reference Time elements (e.g., 16 elements), where each GNSS Reference Time element corresponds to one cell neighboring communications device 100, and where one of the elements is a GNSS Reference Time element for the serving cell of communications device 100. Each GNSS Reference Time element includes a cellular network time data structure, indicating the GNSS system time as noted at the corresponding cell (hereinafter denoted as T1). In an embodiment, T0 and T1 refer to the same GNSS system time but use different time formats (T0 uses a GNSS time format and T1 uses a cellular networking time format). In another embodiment, T0 and T1 have a pre-determined timing offset 'x' between them (e.g., x=T1−T0), which is/will be known to both cellular communications module 106 and GNSS module 104. In this embodiment, the timing offset 'x' is removed from T0 (e.g., T0=T0+x) before T0 is compensated (e.g., by Delta_T as further described below) and sent to GNSS module 104 as further described below. In yet another embodiment, T0 and T1 are mathematically different even after the format conversion, but T0 and T1 record the same absolute moment of time as seen by GNSS systems and cellular networking systems, respectively (given the common understanding of Relativity Theory). Without limitation, the description below assumes the first embodiment where T0 and T1 refer to the same GNSS system time. In different embodiments, T2 can be smaller or larger than or equal to T1.

In an embodiment, GNSS Reference Time elements include a network time data structure defined according to LTE parameters. Accordingly, the network time data structure may include the following fields: SecondsFromFrameStructureStart (integer between 0 and 12533 in units of 10 milliseconds); FractionalSecondsFromFrameStructureStart (integer between 0 and 3999999 in units of 250 nanoseconds; and Cell ID (identifier of the cell corresponding to the GNSS Reference Time element).

In an embodiment, the reference time received from the cellular network by cellular communications module 106 is forwarded, after delay compensation, to GNSS module 104 via AP 102. Delay compensation of the reference time can be performed at cellular communications module 106 and/or AP 102. In an embodiment, the reference time is compensated by adding to it a time difference (hereinafter denoted as Delta_T) between the pulse generation time of PTA pulse 120 (hereinafter denoted as T2) and the reference time (T1), to generate a compensated reference time. Delta_T represents the delay from the time that the serving base station generates the message containing the reference time to the time that cellular communications module 106 generates PTA pulse 120. In an embodiment, Delta_T includes the processing delay of the serving base station from message generation time to message transmission time, the radio propagation delay of the message, and the processing delay of communications device 100 from message reception time to the pulse generation time (T2) of PTA pulse 120.

In an embodiment, the time difference (Delta_T) is computed as the time difference between T2 and the T1 element corresponding to the serving base station of communications device 100. In an embodiment, to compute Delta_T; T2, which is hardware generated, is first converted to a cellular networking time format. With both T1 and T2 in the cellular networking time format, the difference between T2 and T1 is calculated using a function configured to compute an absolute time difference between two time elements in the cellular networking time format. In another embodiment, both T1 and T2 are first converted to absolute time and then Delta_T is computed as the difference between two absolute times.

In an embodiment, the compensated reference time is determined by adding Delta_T to T0 in the same format. As mentioned above, T0 is an absolute time and therefore the addition of Delta_T to T0 does not require any time format conversion. In an embodiment, the compensated reference time is then forwarded via AP 102 to GNSS module 104. In another embodiment, not shown in FIG. 1, the compensated reference time is forwarded by messaging via other signaling paths between cellular communications module 106 and GNSS module 104 (e.g., a UART path between cellular communications module 106 and GNSS module 104 established between respective MAC or RRC layer modules). GNSS module 104 is configured to associate the actual time that it detects FTA pulse 120 (which is substantially equal to pulse generation time T2) from cellular communications module 106 with the compensated reference time to determine a GNSS system time. In other words, GNSS module 104 matches the actual pulse detection time with the time value provided by the compensated reference time.

PA blanking pulse 122 serves to signal to GNSS module 104 time periods (and associated frequencies) within which cellular transmission by cellular communications module 106 is likely to interfere substantially with GNSS signal reception by GNSS module 104, in an embodiment, as further described below with reference to FIG. 5, cellular communications module 106 relies on a radio frequency (RF) interference table to identify such time periods and associated frequencies of high cellular-to-GNSS interference, i.e., when (in the time domain) and on which frequencies (in the frequency domain) the cellular transmission or simultaneous cellular and WLAN or BT transmission jointly will interfere with GNSS module 104. In an embodiment, PA blanking pulse 122 is a holding pulse, which is held high for the duration of a high cellular-to-GNSS interference time period. In another embodiment, PA blanking pulse 122 is a narrow pulse used to signal the beginning and the end of a high cellular-to-GNSS interference time period. Using PA blanking pulse 122, GNSS Module 104 can identify high cellular-to-GNSS interference time periods and can process samples of received satellite signals accordingly. For example, GNSS module 104 can de-weight samples received within the identified high cellular-to-GNSS interference time periods and on the associated frequencies (to avoid relying on erroneous samples) or can increase a sample rate to improve the signal-to-noise ratio (SNR) during the identified high cellular-to-GNSS interference time periods.

Figure 2:
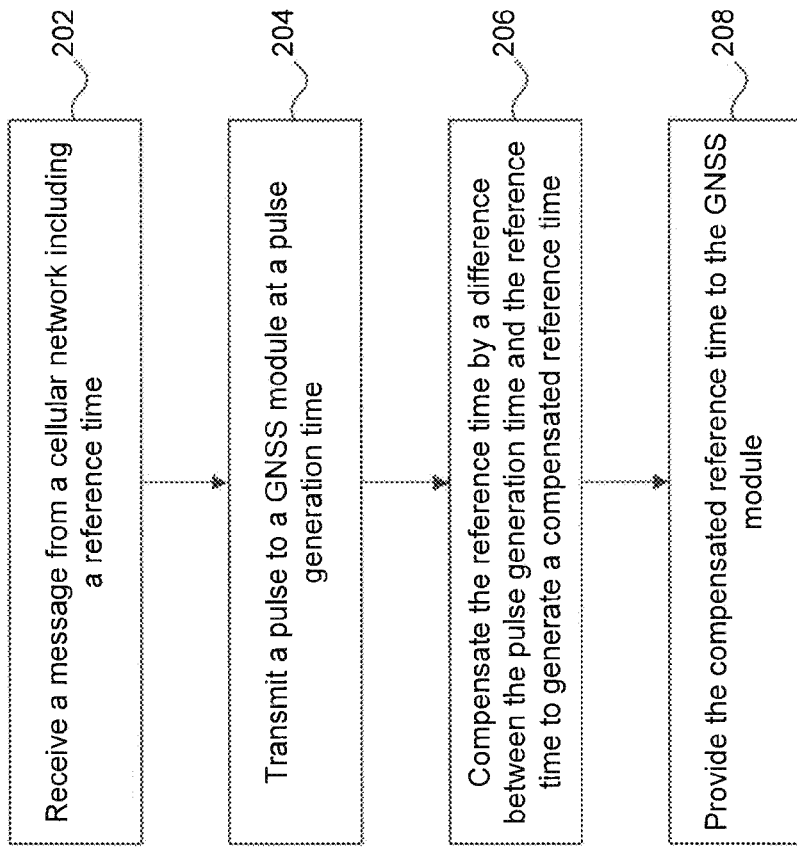
FIG. 2 illustrates an example process according to an embodiment.

FIG. 2 illustrates an example process 200 according to an embodiment. Example process 200 is provided for the purpose of illustration only and is not limiting. Example process 200 can be performed by a cellular communications module, such as cellular communications module 106, alone or in conjunction with an application processor (AP), such as AP 102, to provide Fine Time Assistance (FTA) to a co-located GNSS module.

As shown in FIG. 2, process 200 begins in step 202, which includes receiving a message from a cellular network including a reference time. In an embodiment, step 202 can be performed by a cellular communications module, such as cellular communications module 106, and/or an AP, such as AP 102. In an embodiment, the message includes an LTE LPP message, received by the cellular communications module from a serving base station of the communications device, in response to a location request sent by the cellular communications module to a location server of the cellular network. In an embodiment, the reference time includes one or more of a GNSS system time (T0) and a serving cell GNSS time (T1 that corresponds to the serving cell of the communications device).

Subsequently, process 200 proceeds to step 204, which includes transmitting a pulse to the GNSS module at a pulse generation time. Step 204 can be performed by a cellular communications module, such as cellular communications module 106. In an embodiment, the pulse generation time is greater than the reference time.

Then, in step 206, process 200 includes compensating the reference time by a difference between the pulse generation time and the reference time to generate a compensated reference time. Step 206 can be performed by a cellular communications module, such as cellular communications module 106, and/or an AP, such as AP 102. In an embodiment, step 206 includes adding the time difference between the pulse generation time and the reference time to the reference time to generate the compensated reference time. In an embodiment, the reference time is provided as two elements: a first element in GNSS time format (e.g., T0) and a second element in cellular networking time format (e.g., T1). Accordingly, step 206 further includes converting the pulse generation time to a cellular networking time format, computing an absolute time difference between the converted pulse generation time and the second element of the reference time to generate an absolute time difference; and adding the absolute time difference to the first element of the reference time to generate the compensated reference time.

Process 200 terminates in step 208, which includes providing the compensated reference time to the GNSS module. Step 208 can be performed by a cellular communications, module, such as cellular communications module 106, and/or by an AP, such as AP 102. In another embodiment, step 208 includes providing the first element of the reference time and the absolute time difference to the GNSS module, which computes the compensated reference time by adding the two.

Figure 3:
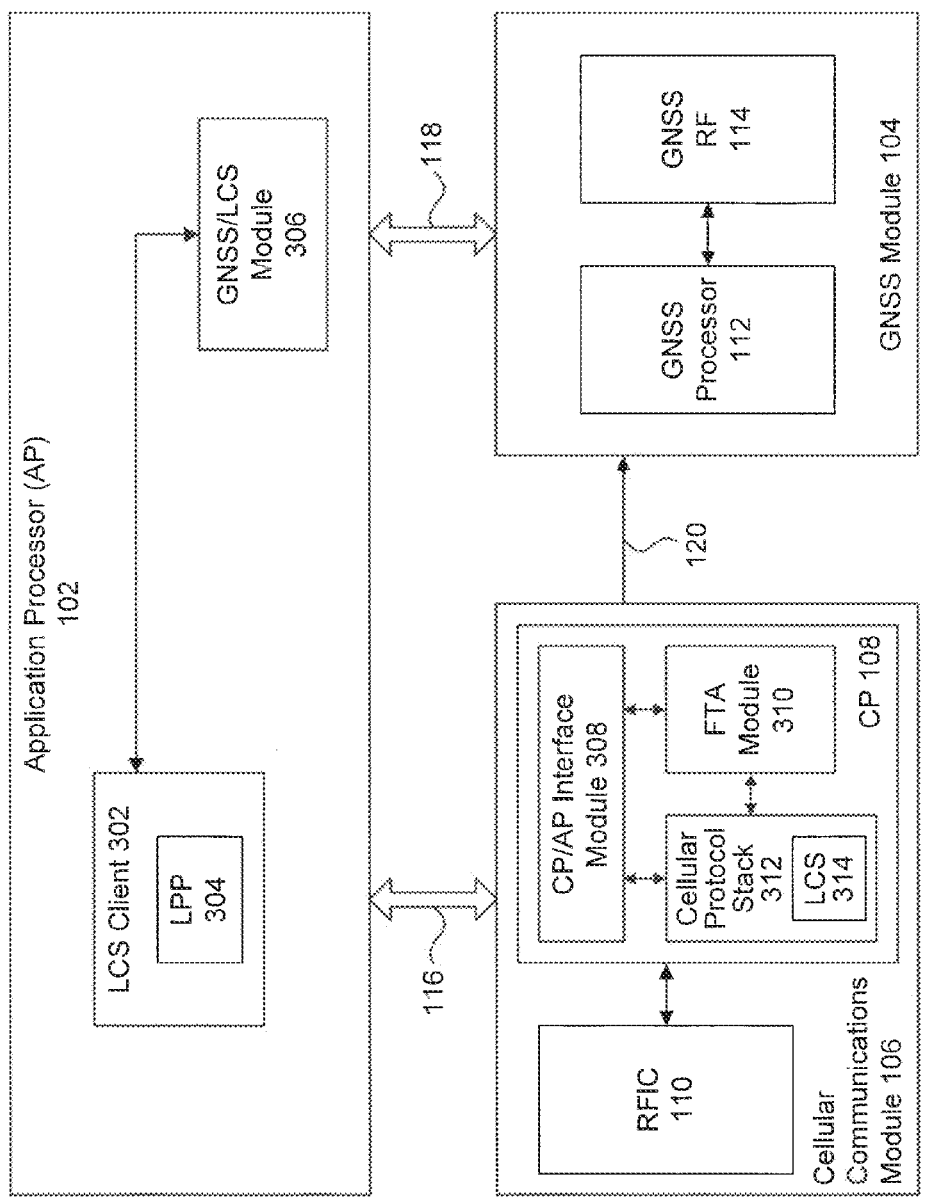
FIG. 3 illustrates another example communications device according to an embodiment.

FIG. 3 illustrates another example communications device 300 according to an embodiment. Example communications device 300 is provided for the purpose of illustration and is not limiting of embodiments of the present disclosure. Communications device 300 may be a smart phone, tablet, or personal computer (PC), for example, which enables data communication (e.g., Internet access, email, smart phone applications, etc.) as well as voice calling. Communications device 300 may support various cellular communication technologies including, without limitation, LTE, HSPA+, W-CDMA, CDMA2000, TD-SCDMA, GSM, GPRS, EDGE, and WiMAX, for example.

Communications device 300 can be an embodiment of communications device 100 described with reference to FIG. 1 above and, as shown in FIG. 3, also includes an AP 102, a GNSS module 104, and a cellular communications module 106. AP 102 enables, without limitation, a Location Service (LCS) client module 302, Which implements a LPP layer 304, and a GNSS/LCS module 306. Cellular communications module 106 includes, without limitation, a CP 108 and an RFIC module 110. CP 108 of cellular communications module 106 enables, without limitation, a CP/AP interface module 308, an FTA module 310, and a cellular protocol stack 312. Cellular protocol stack 312 implements a LCS module 314.

In an embodiment, communications device 300 can be used to implement cellular-to-GNSS fine time assistance (FTA) as described above with reference to FIGS. 1 and 2. In another embodiment, communications device 300 can perform cellular-to-GNSS FTA as further described below with reference to FIG. 4, which illustrates an example process 400 according to an embodiment.

Figure 4:
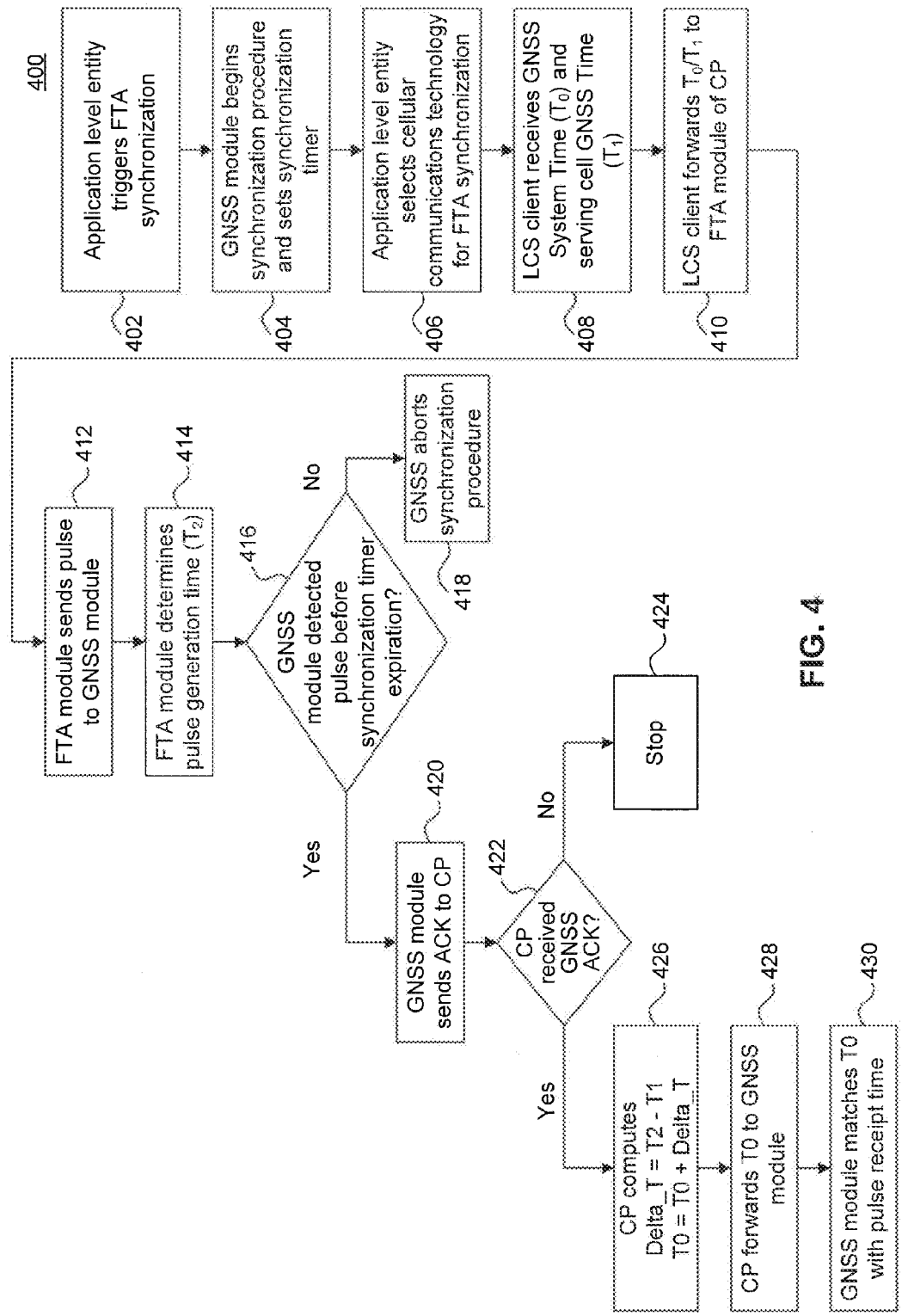
FIG. 4 illustrates another example process according to an embodiment.

As shown in FIG. 4, process 400 begins in step 402, which includes an application level entity triggering ETA synchronization. The application level entity can be an application enabled by AP 102. In response to the triggering of FTA synchronization, LCS client 302 of AP 102 signals GNSS module 104 via GNSS/LCS module 306. In response, GNSS module 104 begins a synchronization procedure and sets a synchronization timer (e.g., 30 seconds) in step 404.

Then, in step 406, the application level entity selects the cellular communication technology to be used for FTA synchronization. For example, the application level entity can select whether FTA synchronization is performed using LTE or a 2G/3G cellular communication technology. In an embodiment, the application level entity selects LTE whenever FTA synchronization service through LTE is available, and, if not available (e.g., LTE Assisted-GNSS unavailable and/or LTE modem in idle/sleep mode), selects a 2G/3G communication technology.

Subsequently, LCS client 302 (via LPP layer 304 when LTE is used, or another equivalent protocol when another cellular communication technology is used) generates a location request to send to a location server of the cellular network. In an embodiment, the location request is forwarded from LCS client 302 to cellular protocol stack 312 of CP 108 via CP/AP interface module 308. The location request can be included in an LPP message and can be stored in LCS module 314 of cellular protocol stack 312. Cellular protocol stack 312 uses RFIC module 110 (shown in FIG. 1) to transmit the location request to a serving cell of communications device 300.

In response to the location request, the serving cell of communications device 300 sends an assistance message to communications device 300. The assistance message can be an LPP message and includes, among other components, a reference time. In an embodiment, as described above, the reference time includes a GNSS system time (T0) and a serving cell GNSS time (T1 that corresponds to the serving cell of communications device 300).

The assistance message is received by cellular communications module 106 and forwarded to AP 102. In an embodiment, the assistance message is an LPP message, which is forwarded to LPP layer 304 of LCS client 302 for processing. Upon processing of the LPP message by LPP layer 304, LCS client 302 receives GNSS system time (T0) and serving cell GNSS time (T1) in step 408.

Then, in step 410, LCS client 302 forwards T0 and T1 to FTA module 310 of CP 108. In an embodiment, LCS client 302 forwards T0 and T1 to LCS module 314 of cellular protocol stack 312, and FTA module 310 retrieves T0 and T1 from LCS module 314. In another embodiment, LCS client 302 forwards T0 and T1 to CP/AP interface module 308, which calls FTA module 310 to generate FTA pulse 120.

In step 412, FTA module 310 generates FTA pulse 120 at a pulse generation time. In an embodiment, FTA module 310 generates FTA pulse 120 as soon as possible upon receiving the call from CP/AP interface module 308. In another embodiment, FTA module 310 retrieves the pulse generation time (T2) from cellular protocol stack 512 and generates FTA pulse 120 at the specified pulse generation time.

Subsequently, in step 414, FEN module 310 determines the pulse generation time (T2). If FTA module 310 generated FTA pulse 120 after retrieving the pulse generation time from cellular protocol stack 312, then FTA module 310 already knows the pulse generation time (T2) and does nothing in step 414. Otherwise, FTA module 310 communicates with cellular protocol stack 312 to retrieve the actual time at which FTA pulse 120 was generated. In an embodiment, FTA pulse 120 is generated using a hardware timer and FTA module 310 requests that cellular protocol stack 312 provide the actual time that the hardware timer expired, triggering generation of FTA pulse 120. In an embodiment, FTA module 310 then forwards T2, together with a difference function configured to compute an absolute time difference between two time elements in cellular networking time format, to CP/AP interface module 308 and/or LCS module 314.

In one embodiment, T2 is pre-determined by FTA module 310 as a time moment in the near future after the FTA synchronization process starts in process 400, and is indicated to a hardware module that generates FTA pulse 120 at this pre-determined moment. In another embodiment, T2 is recorded by FTA module 310 as the moment when the hardware and/or the hardware driver module generates FTA pulse 120 at the instruction of FTA module 310, immediately or otherwise, and then indicates the remembered T2 value to the FTA module 310.

Subsequently, in step 416, GNSS module 104 determines whether or not it detected FTA pulse 120 before the expiration of the synchronization timer. If not, process 400 proceeds to step 418, in which GNSS module 104 aborts the synchronization procedure. In another embodiment, GNSS module 104 in step 418 triggers another FTA synchronization procedure independent of the current FTA synchronization procedure, which is terminated in step 418. Otherwise, GNSS module 104 records the pulse detection/receipt time and process 400 proceeds to step 420, which includes GNSS module 104 sending an acknowledgment (ACK) to CP 108 via AP 102.

Then, in step 422, CP 108 determines whether or not the ACK from GNSS module 104 has been received. In an embodiment, step 422 is performed by CP/AP interface module 308 and/or by LCS module 314. If the ACK was not received, process 400 terminates in step 424. In another embodiment, GNSS module 104 in step 424 triggers another FTA synchronization procedure independent of the current FTA synchronization, which is terminated in step 424. Otherwise, process 400 proceeds to step 426, which includes GP 108 computing Delta_T=T2−T1 and updating T0 to the value T0+Delta_T. In an embodiment, step 426 is performed by CP/AP interface module 308 and/or LCS module 314 using the difference function forwarded by FTA module 310 to CP/AP interface module 308 and/or LCS module 314.

Subsequently, CP 108 forwards T0, via AP 102, to GNSS module 104 in step 428. In an embodiment, step 428 is performed by CP/AP interface module 308 and/or LCS module 314. Upon receiving T0, GNSS module 104 matches T0 with the pulse receipt time in step 430. This allows GNSS module 104 to identify the actual value of the GNSS system time (given by T0) at the time instant given by the pulse receipt time. Knowing the pulse receipt time and the GNSS system time value (T0) at the pulse receipt time, GNSS module 104 can determine the Current GNSS system time by adding to T0 the amount of time that passed since the pulse receipt time. GNSS module 104 can then use the determined GNSS system time to calibrate its local timing as needed.

Figure 5:
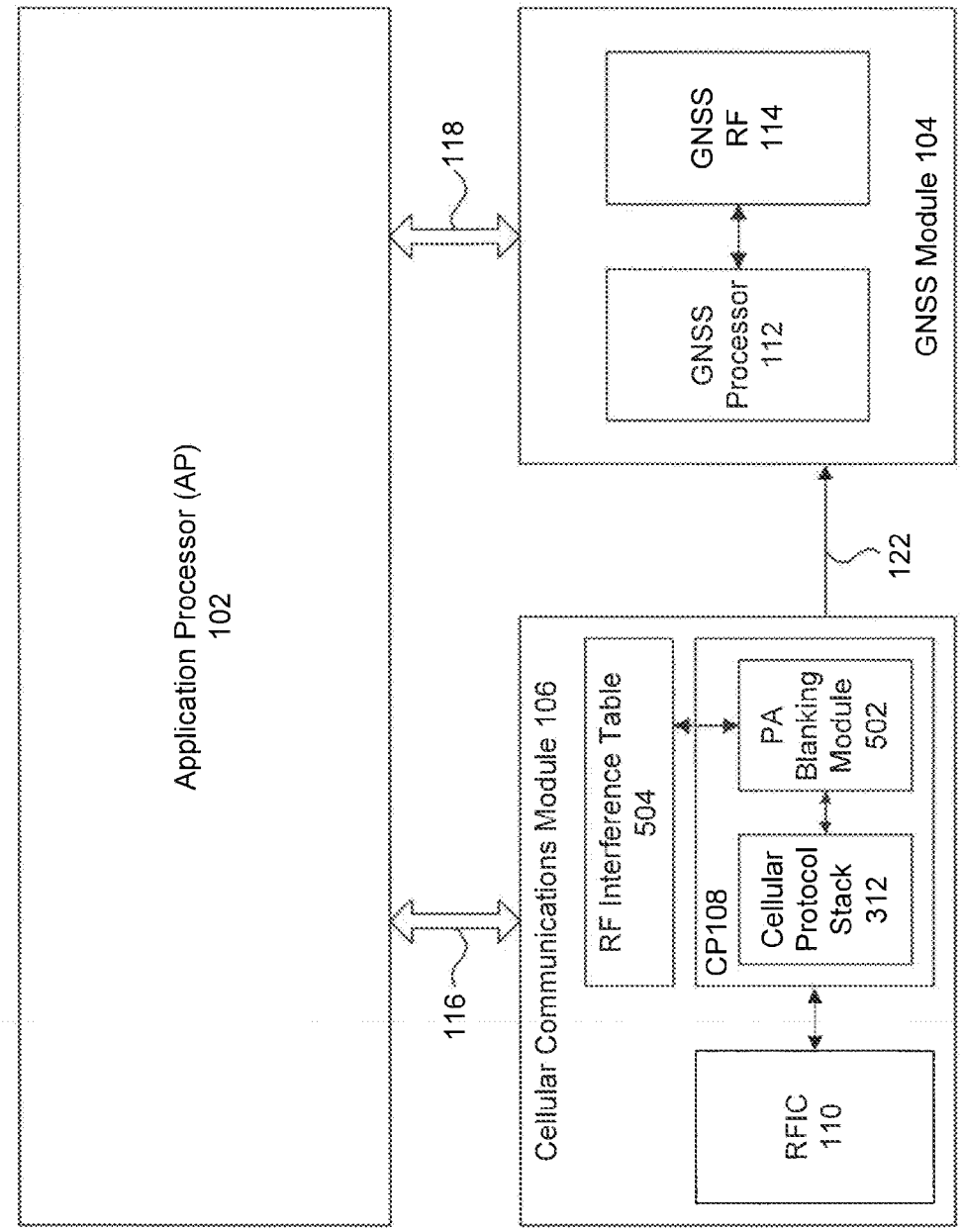
FIG. 5 illustrates another example communications device according to an embodiment.

FIG. 5 illustrates another example communications device 500 according to an embodiment. Example communications device 500 is provided for the purpose of illustration and is not limiting of embodiments of the present disclosure. Communications device 500 may be a smart phone, tablet, or personal computer (PC), for example, which enables data communication (e.g., Internet access, email, smart phone applications, etc.) as well as voice calling. Communications device 500 may support various cellular communication technologies including, without limitation, LTE, HSPA+, W-CDMA, CDMA2000, TD-SCDMA, GSM, GPRS, EDGE, and WiMAX, for example.

Communications device 500 can be an embodiment of communications device 100 described with reference to FIG. 1 above and, as shown in FIG. 5, also includes an AP 102, a GNSS module 104, and a cellular communications module 106. Cellular communications module 106 includes, without limitation, a CP 108, an RFIC module 110, and an RF interference table 504. RF interference table 504 can be generated offline or dynamically based on real time measurements by GNSS module 104, and stored in a memory (e.g., read-only memory (ROM)) of cellular communications module 106. In an embodiment, RF interference table 504 includes a lookup table that tells cellular communications module 106 exactly when (in time), for how long (in time), or where (in frequency) power amplifier (PA) blanking is needed to avoid, cellular transmission de-sensing the GNSS receiver. CP 108 of cellular communications module 106 enables, without limitation, a cellular protocol stack 312 and a power amplifier (PA) blanking module 502.

In an embodiment, communications device 500 can be used to implement a PA blanking pulse 122 as described above with reference to FIG. 1 and further below. Specifically, PA blanking module 502 is configured to periodically communicate with cellular protocol stack 312 to determine scheduled transmission time periods and associated transmission power levels of cellular communications module 106. Using the transmission power levels, PA blanking module 502 consults RE interference table 504 to determine which of the scheduled transmission, time periods correspond to high cellular-to-GNSS interference time periods, and which cellular/WLAN/BT frequency bands and GNSS frequency band combination (operational frequency band combinations) scenarios may result in interference to the GNSS receiver. High cellular-to-GNSS interference time periods include time periods for which cellular transmission power level is anticipated to substantially impact GNSS reception. For example, a maximum acceptable cellular transmission power level can be determined using offline testing or dynamically through measurements by GNSS module 104 (e.g., GNSS module 104 can make dynamic SNR measurements to determine the maximum cellular transmission power for which SNR is above a defined level). A time period with a cellular transmission power level above the maximum acceptable cellular transmission power level is considered a high cellular-to-GNSS interference time period.

Subsequently, PA blanking module 502 generates PA blanking pulse 122 to signal any identified high cellular-to-GNSS interference time period. In an embodiment, PA blanking pulse 122 is a holding pulse, which is held high for the duration of the high cellular-to-GNSS interference time period. In another embodiment, PA blanking pulse 122 is a narrow pulse used to signal the beginning and the end of the high cellular-to-GNSS interference time period.

Using PA blanking pulse 122, GNSS module 104 can identify high cellular-to-GNSS interference time periods and can process samples of received satellite signals accordingly. For example, GNSS module 104 can de-weight samples received within the identified high cellular-to-GNSS interference time periods (to avoid relying on erroneous samples) or can increase a sample rate to improve the signal-to-noise ratio (SNR) during the identified high cellular-to-GNSS interference time periods.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A method for providing Fine Time Assistance (FTA) to a Global Navigation Satellite System (GNSS) module, comprising:
   receiving a reference time;
   transmitting a pulse to the GNSS module at a pulse generation time;
   computing a time difference between the pulse generation time and the reference time, wherein computing the time difference comprises converting the pulse generation time to a cellular networking time format and providing the pulse generation time and the reference time to a function configured to compute an absolute time difference between two time elements in the cellular networking time format;
   compensating the reference time by the time difference between the pulse generation time and the reference time to generate a compensated reference time; and
   providing the compensated reference time to the GNSS module.

2. The method of claim 1, wherein receiving the reference time comprises receiving a message from a cellular network including the reference time.

3. The method of claim 2, wherein the message includes a Long Term Evolution (LTE) Location Positioning Protocol (LPP) message.

4. The method of claim 1, wherein the reference time includes one or more of: a GNSS system time and a serving cell GNSS time.

5. The method of claim 4, wherein the GNSS system time and the serving cell GNSS time refer to a same time instant or to two different time instants with a known time offset.

6. The method of claim 1, wherein compensating the reference time comprises adding the time difference between the pulse generation time and the reference time to the reference time to generate the compensated reference time.

7. The method of claim 1, wherein the absolute time difference is in a GNSS time format.

8. The method of claim 1, wherein the method is performed by a cellular communications module co-located with the GNSS module in a communications device.

9. A communications device, comprising:
   a Global Navigation Satellite System (GNSS) module; and
   a cellular communications module,
   wherein the cellular communications module is configured to receive a reference time, transmit a pulse to the GNSS module at a pulse generation time, compute a time difference between the pulse generation time and the reference time, and provide a compensated reference time based on the time difference between the pulse generation time and the reference time to the GNSS module.

10. The communications device of claim 9, wherein the cellular communications module is further configured to receive the reference time in a message from a cellular network.

11. The communications device of claim 10, further comprising:
    an application processor (AP) configured to execute at least one Location Service (LCS) client.

12. The communications device of claim 11, wherein the message includes a Long Term Evolution (LTE) Location Positioning Protocol (LPP) message received in response to a location request from the LCS client to the cellular network.

13. The communications device of claim 11, wherein the cellular communications module is configured to provide the compensated reference time to the GNSS module via the AP.

14. The communications device of claim 9, wherein the cellular communications module is further configured to add the time difference between the pulse generation time and the reference time to the reference time to generate the compensated reference time.

15. The communications device of claim 9, wherein the GNSS module is configured to associate the pulse generation time with the compensated reference time to determine a system time.

16. The communications device of claim 15, wherein the system time includes a GNSS system time.

17. A communications device, comprising:
    a Global Navigation Satellite System (GNSS) module; and
    a cellular communications module,
    wherein the cellular communications module is configured to transmit a fine time assistance pulse to the GNSS module to signal a high cellular-to-GNSS interference time period caused by a cellular transmission signal transmitted during the high cellular-to-GNSS interference time period,
    wherein the fine time assistance pulse represents a reference time that has been compensated for a propagation delay and a processing delay.

18. The communications device of claim 17, wherein the high cellular-to-GNSS interference corresponds to a time period for which a transmission power level of the cellular communications module is anticipated to substantially impact reception by the GNSS module.

19. The communications device of claim 17, wherein the cellular communications module comprises:
    a memory configured to store a radio frequency (RF) interference table; and
    a processor configured to implement a cellular protocol stack and a power amplifier (PA) blanking module,
    wherein the PA blanking module is configured to periodically communicate with the cellular protocol stack to determine scheduled transmission time periods, associated frequency bands, and associated transmission power levels of the cellular communications module and to identify, using the RF interference table, high cellular-to-GNSS interference time periods among the scheduled transmission time periods of the cellular communications module.

20. The communications device of claim 17, wherein the GNSS module is configured to de-weight samples of satellite signals received during the high cellular-to-GNSS interference period.

21. The communications device of claim 17, wherein the communications device further comprises a Wireless Local Area Network (WLAN) module and a Bluetooth (BT) module, and wherein the cellular communications module is further configured to identify operational frequency band combinations of the GNSS module, the cellular communications module, the WLAN module, and the BT module that result in interference on the GNSS module.

* * * * *